A. J. COOK.

2 Sheets—Sheet 1.

Harvester.

No. 1,722.

Reissued July 5, 1864.

WITNESSES

INVENTOR

N. PETERS. Photo-Lithographer, Washington, D. C.

A. J. COOK.
2 Sheets—Sheet 2.
Harvester.
No. 1,722.
Reissued July 5, 1864.
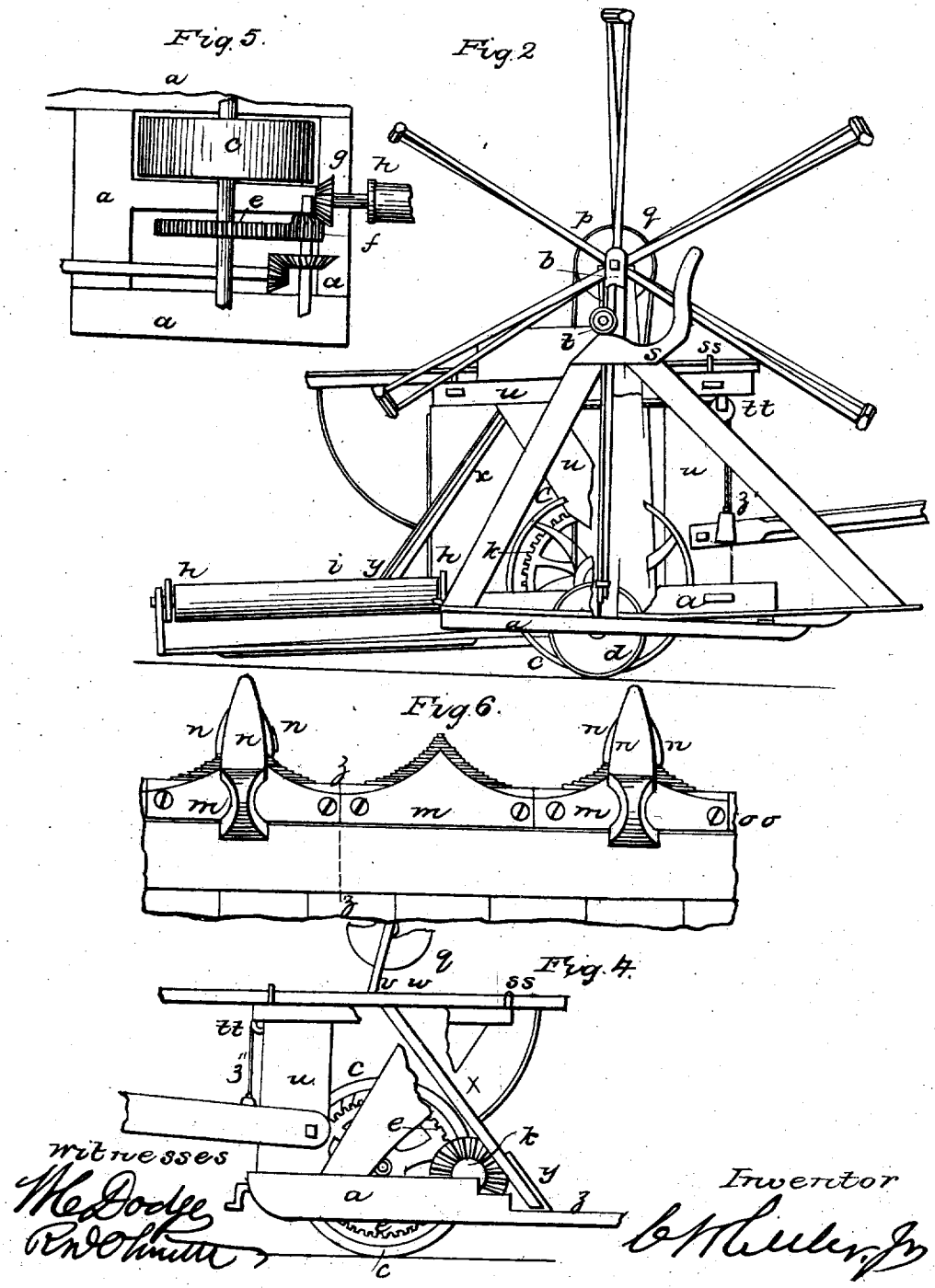
N. PETERS, Photo-Lithographer, Washington, D. C.

UNITED STATES PATENT OFFICE.

CYRENUS WHEELER, JR., OF POPLAR RIDGE, N. Y., ASSIGNEE OF A. J. COOK.

IMPROVEMENT IN HARVESTERS.

Specification forming part of Letters Patent No. 10,691, dated March 28, 1854; Reissue No. 1,722, dated July 5, 1864.

DIVISION A.

*To all whom it may concern:*

Be it known that A. J. COOK, formerly of Enon, Ohio, now of St. Louis county, in the State of Missouri, invented certain new and useful Improvements in Reaping and Mowing Machines; and I hereby declare that the following is an exact description of the construction and operation thereof, reference being had to the accompanying drawings and the letters of reference marked thereon, in which—

Figure 1:
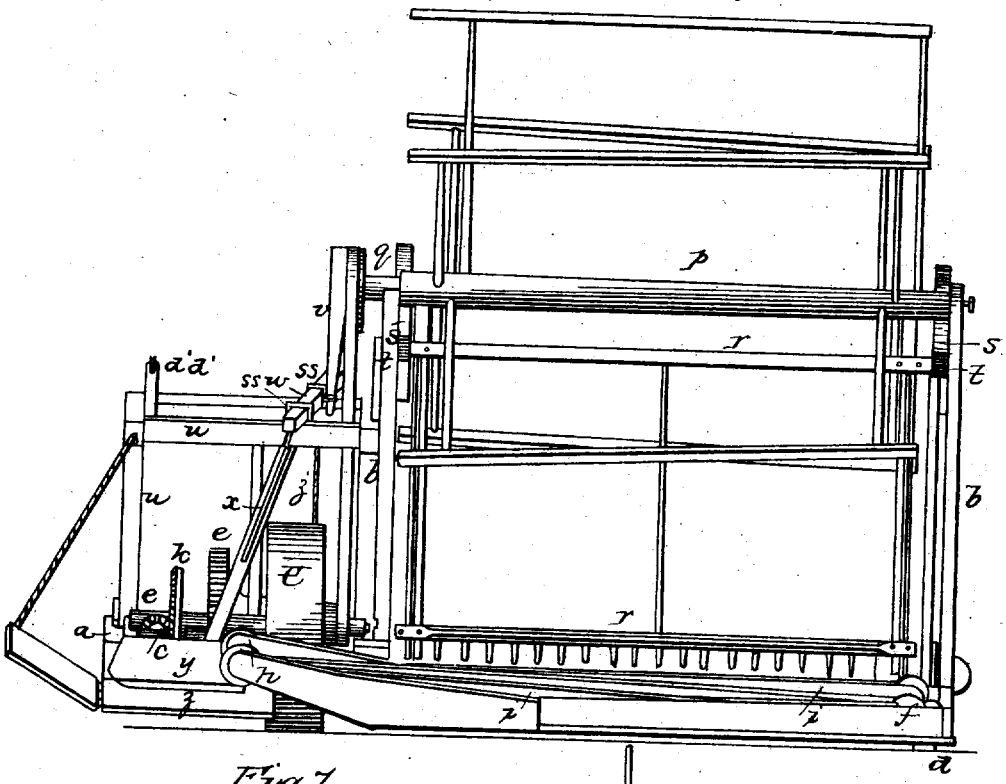
Figure 7:
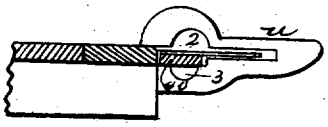
Figure 3:
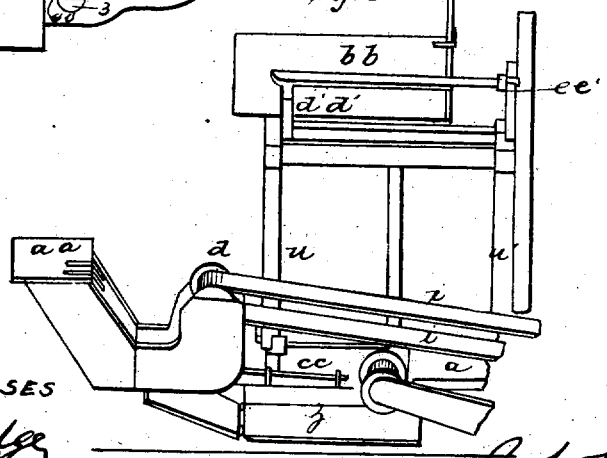

Figure 1 is a rear view or elevation of the machine. Fig. 2 is a view of the right-hand or grain side of the machine. Fig. 3 is a rear view of a portion of the frame-work, showing the binder's seat and the means of attachment. Fig. 4 is a view of a portion of the left-hand or gearing side of the machine, showing the devices for discharging the gavels and the arrangement of gearing. Fig. 5 is a top or plan view of the gearing and a portion of the roller for driving the endless apron. Fig. 6 is a plan or top view of the cutting apparatus with a portion of the platform attached. Fig. 7 is a section taken in the line *z z* of Fig. 6.

Where the same letters appear like parts are indicated in all the figures.

This branch of the invention relates to the discharge of the crop from the machine; and the nature of the invention consists in the arrangement of devices acting automatically for the discharge of the gavels as they accumulate in a receiver.

To enable others skilled in the art to construct and use the invention, I will proceed to describe the same.

A suitable frame, *a*, is provided with uprights or stanchions *b* affixed. This frame is mounted upon wheels *c* and *d*, the axle working in suitable boxes which may be depressed or raised by set-screws or any other mechanical means, so that the grain can be cut at any height from the ground. The wheel *c*, which serves as a driver for the other machinery, is made large and heavy and carries on its axle a gear-wheel, *e*, which gears with a pinion, *f*. This pinion has bevel-gear that meshes with another bevel-gear, *g*, hung on the roller *h*, upon which and the roller *j* the endless apron *i* revolves. On the shaft of the pinion *f* a larger bevel-wheel, *k*, is keyed. This wheel causes a smaller one, *l*, to revolve, having on its shaft at the front end of the machine a crank or bent arm. To this arm a pitman connects a bar, *o o*, carrying a sickle or cutter, *m*, by which means the sickle or cutter receives a reciprocating motion through the guards *n*, (see Figs. 6 and 7,) the guard-fingers being of that kind having a support for the crop above as well as below the plane in which the cutter vibrates, commonly designated as "slotted fingers."

Mounted upon the stanchions or supports *b*, the reel *p* is caused to revolve by means of the pulley *q*, belted to a drum, *o*, on the shaft of the driving-wheel *c*. This reel (see Figs. 1 and 2) carries on one set of its arms a rake-frame, *r*, having friction-rollers *t* on the extremities of its upper cross-tie.

Firmly fastened to the sides of the stanchions or reel-supports *b* are cam-pieces *s*. By means of these cam-pieces the rake-frame *r*, which has a sliding motion on its supports, is controlled in its motions from the time it enters the standing grain (in its revolution with the reel to which it is connected) until it removes the cut grain from the platform on which it falls to the endless apron *i*. The rake *r* serves a double purpose—that of a rake to remove the grain from the platform, and as one of the wings of the reel to bring the crop back to the cutting apparatus. By revolving with the reel it takes hold of the grain to be removed nearer the cutters, and consequently nearer the bottom of the straw, dividing the fallen from the falling grain and discharging it in better form.

Above the gearing a strong frame, *u*, is made, to which the draft-bar or tongue is fastened.

From the pulley *q* of the reel an arm, *v*, projects downward, and strikes at intervals, during the revolution of the reel, a bar, *w*, resting upon the top of the frame *u*. This bar is fitted so as to slide in loops or staples *s s*, and has an arm, *x*, projecting diagonally downward toward the rear of the machine, so as to be over the receiver *z* and near the front end on the gearing side of the apron *r*. To the arm *x*, at its lower end, is bolted a board or plate, *y*. The receiver *z* has a side-board hinged to it and held up by a cord made fast to frame *u*. To the arm *x*, for the purpose of drawing it back, a weighted cord, *z'*, passes over a roller, *t t*, secured at the forward part of the machine, as seen in Fig. 2.

To complete the machine so as to adapt it to the different conditions of the crop to be cut, a seat, *a a*, for binding purposes, also a rack, *b b*, for holding the sheaves or bundles, may be placed, when necessary, to the reaper. This seat, (see Fig. 3,) when placed on the machine, extends from the front to the back, and is held to the frame by two or more pieces, *c c*, passing through straps in the frame. There is also attached a roller, *d d*, to which the apron *i*, if lengthened, can be attached.

The rack *b b* rests upon an arm, *d′ d′*, projecting above the frame *u*, and also upon a raised board, *e′ e′*. By this means, having its bearing at these points, it is capable, if slight pressure be applied at the back end of the rack, of lowering so as to discharge the sheaves of grain in order for shocking.

Having described its construction, its operation is as follows: The progressive movement of the machine over the ground by means of the wheel *c* motion is imparted to the different parts of the machine. The reel in revolving by its arrangement of arms inclines the crop backward and downward, which is severed by the action of the cutting apparatus and falls upon the platform, from which, as the reel revolves, it is removed to the endless or revolving apron *i* by the action of the rake *r*, which takes hold of the grain at a point just behind the sickle at a suitable distance from the platform, which distance is retained by the action of the friction-rollers on the cam-pieces *s*. The endless apron *i* carries the grain received upon it to the receiver *z*, from which it is discharged by the plate *y* by means of the devices connecting it with the sliding bar *w*, actuated by the arm *v* on the reel-pulley *q*.

The foregoing arrangement is used when the grain is wet or green or not suitable for binding at the time of cutting. If the grain is in proper condition and it is desirable to bind it immediately, the arrangement described and shown in Fig. 3 is used. The apron *i*, which carries the grain to the receiver *z*, in the previously-described arrangement, is extended out so as to pass over *d d*. In front of it is seated the binders. As the grain reaches the head of the apron the binders catch it, and, having properly bound it in sheaves, pass it upon the tilt-rack *b b*, and from thence by pressure of the hand it is thrown on the ground in sufficient numbers to form a shock.

Having described the construction and operation of so much of the machine as relates to this branch of the invention, a more minute description of what relates to and will be embraced in another and separate application is deemed unnecessary.

What I claim as new, and desire to secure by Letters Patent, is—

1. The device for discharging the grain from the receiver *z*, in combination with the arm *v* and apron *i*, substantially as described.

2. The rake *r*, revolving with and making one of the wings of the reel, in combination with the cam-surfaces so mounted on the reel-supports as to guide the rake in its removal of the grain from the platform in a path parallel thereto, substantially as described.

C. WHEELER, JR.

Witnesses:

S. J. BOWEN,

H. UNDERHILL.